Feb. 6, 1968 E. L. ZWICKEL 3,367,093
RAKE ATTACHMENT FOR ROTARY MOWERS
Filed Dec. 17, 1964
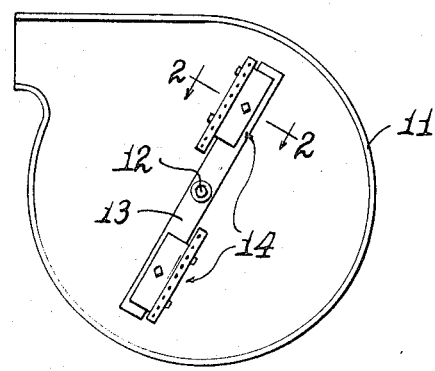
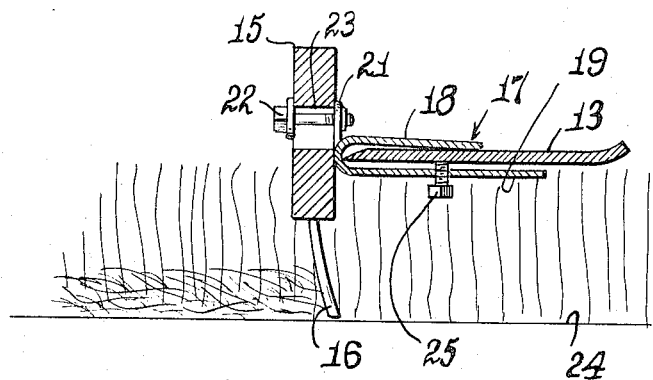
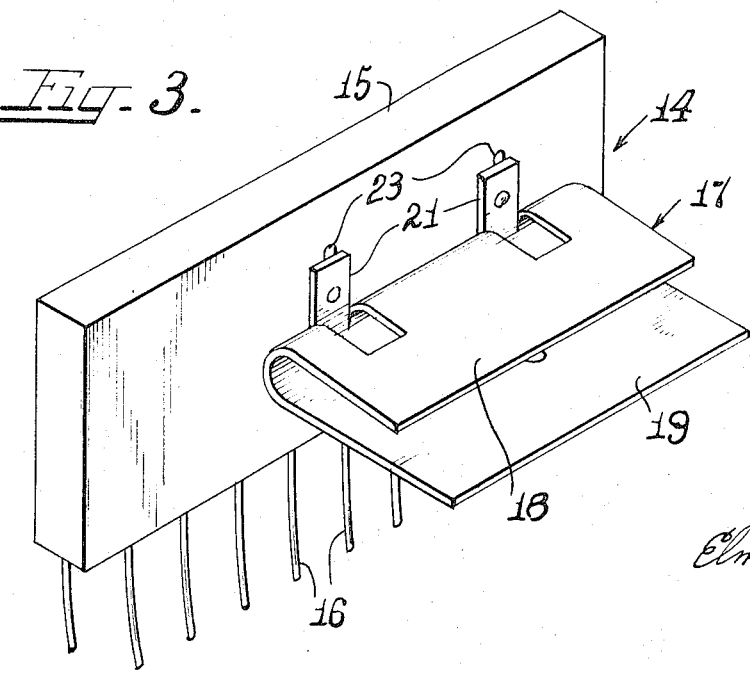
INVENTOR.
Elmer L. Zwickel

United States Patent Office 3,367,093
Patented Feb. 6, 1968

3,367,093
RAKE ATTACHMENT FOR ROTARY MOWERS
Elmer L. Zwickel, 403 W. Fremont St.,
Elmhurst, Ill. 60126
Filed Dec. 17, 1964, Ser. No. 419,144
3 Claims. (Cl. 56—27)

ABSTRACT OF THE DISCLOSURE

A rake assembly for a rotary lawn mower having a rake element adjustably mounted on a clamp secured to the cutter bar of the mower.

---

This invention relates to improvements in rotary lawn mowers and is particularly concerned with such a mower equipped with a thatch rake.

More particularly, the invention is concerned with the construction and assembly of a novel rake assembly adapted for easy attachment to the cutter bar of a rotary mower. It comprises a bracket and means for securing the bracket to the blade, and a rake element attached to the bracket preferably in a manner to allow it to be vertically adjusted to insure its proper relation to the ground surface over which it is advanced.

It is therefore an object of the invention to provide a novel lawn mower-rake combination.

Another object is to provide a novel rake assembly for attachment to a rotary lawn mower.

Another object is to provide a device of the character described which is not expensive or difficult to manufacture, is easy to mount on and remove from a lawn mower and which is highly efficient in use.

The structure by means of which the above noted and other advantages of the invention are attained will be described in the following specification, taken in conjunction with the accompanying drawings, showing a preferred illustrative embodiment of the invention, in which:

FIG. 1 is a bottom plan view of a rotary lawn mower showing the rake assembly mounted on the cutter bar thereof.

FIG. 2 is a vertical sectional view through the cutter bar and rake assembly, taken substantially on line 2—2 of FIG. 1.

FIG. 3 is a perspective view of an exemplary embodiment of the rake assembly.

Referring to the exemplary disclosure in the accompanying drawings, the lawn mower illustrated is exemplary and it includes the usual housing 11 and a driven motor shaft 12 upon which is mounted firmly the cutter bar 13. The radial arms of the cutter bar each have mounted thereon a novel rake assembly 14.

As best shown in FIGS. 2 and 3, the rake element of the assembly comprises a mounting bar 15 of rigid stock having a plurality of resiliently yieldable tines or prongs 16 depending from its bottom edge. The rake element is mounted on a bracket 17 which preferably is fabricated from sheet metal into substantially the elongated U-shape shown having upper and lower walls 18 and 19. The upper wall 18 preferably has a pair of lugs 21 struck upwardly therefrom each of which has a threaded aperture to receive rake element mounting bolts 22. These bolts extend through slots 23 in the mounting bar 15 so as to permit vertical adjustment of said bar for locating the ends of the tines or prongs 16 the requisite distance from the ground surface 24. The bracket 17 is secured telescoped over the cutter bar as shown by one or more tightening bolts 25 carried by the bottom bracket wall 19.

It should be evident that when the mower is operated the tines or prongs 16 will engage and sweep up matted leaves, grass cuttings, etc., commonly called "thatch." Such sweepings can be discharged into the conventional lawn mower catcher or bag (not shown) or it may be discharged loosely over the lawn surface for subsequent retrieving.

Although I have described a preferred embodiment of my invention, in considerable detail, it will be understood that the description thereof is intended to be illustrative rather than restrictive, as many details of the structure disclosed may be modified or changed without departing from the spirit or scope of the invention. Accordingly, I do not desire to be restricted to the exact construction described.

I claim:

1. A rake assembly adapted to be attached to a rotary cutter bar comprising: a bracket adapted to be secured to one end of such a rotary cutter bar, a mounting bar adjustably attached to said bracket perpendicular thereto, and rake tines depending from said mounting bar for raking material disposed on the ground.

2. The rake assembly recited in claim 1, in which the bracket is substantially U-shaped.

3. A rotary rake assembly comprising, a rotary cutter bar, a bracket attached to each end of said cutter bar, a mounting bar attached to each bracket perpendicular thereto, and rake tines depending from each of said mounting bars for raking material disposed on the ground.

References Cited

UNITED STATES PATENTS

| | | | |
|---|---|---|---|
| 2,863,162 | 12/1958 | Draughon | 56—295 X |
| 3,015,929 | 1/1962 | Bright | 56—295 X |
| 3,117,633 | 1/1964 | Hosek | 56—295 X |

ABRAHAM G. STONE, *Primary Examiner.*
RUSSELL R. KINSEY, *Examiner.*